United States Patent
Guedalia et al.

(10) Patent No.: US 6,952,720 B2
(45) Date of Patent: Oct. 4, 2005

(54) ON-THE-FLY MESSAGE NOTIFICATION SYSTEM AND METHODOLOGY

(75) Inventors: David Guedalia, Beit Shemesh (IL); Gavriel Raanan, Beit Shemesh (IL)

(73) Assignee: NMS Communications, Framingham, MA (US)

( * ) Notice: Subject to any disclaimer, the term of this patent is extended or adjusted under 35 U.S.C. 154(b) by 783 days.

(21) Appl. No.: 09/799,263

(22) Filed: Mar. 5, 2001

(65) Prior Publication Data

US 2001/0042136 A1 Nov. 15, 2001

Related U.S. Application Data

(63) Continuation of application No. 60/190,462, filed on Mar. 17, 2000.

(51) Int. Cl.[7] .............................................. G06F 15/16
(52) U.S. Cl. ...................... 709/206; 709/207; 709/231; 379/93.01; 379/93.24; 379/88.22; 379/100.06
(58) Field of Search ................................ 709/206, 207, 709/231, 240, 245; 379/88.22, 100.06, 93.24, 93.01; 340/825.51

(56) References Cited

U.S. PATENT DOCUMENTS

| | | | | |
|---|---|---|---|---|
| 5,764,916 A | * | 6/1998 | Busey et al. ................ | 709/227 |
| 5,937,161 A | | 8/1999 | Mulligan et al. ...... | 395/200.36 |
| 5,995,597 A | * | 11/1999 | Woltz et al. ............. | 379/93.24 |
| 6,021,433 A | * | 2/2000 | Payne et al. ................ | 709/219 |
| 6,067,561 A | * | 5/2000 | Dillon ........................ | 709/206 |
| 6,118,856 A | * | 9/2000 | Paarsmarkt et al. ..... | 379/93.24 |
| 6,128,646 A | * | 10/2000 | Miloslavsky ................ | 709/206 |
| 6,233,318 B1 | * | 5/2001 | Picard et al. ............ | 379/88.17 |
| 6,446,118 B1 | * | 9/2002 | Gottlieb ...................... | 709/217 |

OTHER PUBLICATIONS

MCCIS Administrators' Guide–FAQs–Netork, http://cliffie.nosc.mil/~NAMADM, pp. 1–7, 2001.
Sendmail, Inc. Home Page, http://store.sendmail.com, p. 1, 1999.
Bernstein, Internet Mail, "Qmail: A Replacement for Sendmail", http://cr.yp.to/qmail.html, 2001, pp. 1–5.
Innovation Resources Online, http://www.innovationresources.com/main_files/main.html, p. 1, 2001.

* cited by examiner

Primary Examiner—Frantz B. Jean
(74) Attorney, Agent, or Firm—Barry W. Chapin, Esq.; Chapin & Huang, Esq.

(57) ABSTRACT

A message notification system and methodology including an on-the-fly message parser which parses data in an incoming message as the message is received and produces on-the-fly parsed information and an on-the-fly message notification generator, producing a message notification in response to the on-the-fly parsed information, at least partially while the on-the-fly message parser parses the data in the incoming message.

12 Claims, 4 Drawing Sheets

ON-THE-FLY MESSAGE NOTIFICATION SYSTEM AND METHODOLOGY

This application claims the benefit of Provisional Application Ser. No. 60/190,462, filed Mar. 17, 2000.

FIELD OF THE INVENTION

The present invention relates to e-mail notification systems and methods generally.

BACKGROUND OF INVENTION

Electronic mail (e-mail) has rapidly become one of the most widely used application on the Internet and one of the most popular means of communication today, both for business purposes and for personal enjoyment. It is a quick and efficient way of maintaining regular contact and communicating on a worldwide scale. Statistics show that over 30 million people will use e-mail within any given twenty-four hour period.

E-mail may be understood to be essentially "the transmission of messages over communications networks". An e-mail message is an electronic letter, which is transmitted via the Internet. To enable parties to communicate on the same terms when sending and receiving e-mail messages, devices on the network use a standard form of communication, known as a protocol. SMTP (Simple Mail Transfer Protocol) is the standard Internet protocol used in communications between the client and server and "forms the backbone of the Internet mail system". The protocol that allows for files of various types—for example, video or graphic files—to be sent and received by e-mail, is known as MIME (Multipurpose Internet Mail Extensions).

Once an e-mail message has been composed and sent, it is typically relayed to an SMTP server. A server is basically a computer, providing a service to other computers on the same network. A client is essentially a computer that requests a service from a computer functioning as a server.

An SMTP server typically communicates through and understands only SMTP. The SMTP server checks the e-mail address of the recipient and relays the mail to the recipient's mail server. When the message arrives at the recipient's mail server, the message is stored in the recipient's mailbox on the SMTP server until it is retrieved by the recipient.

Mailbox formats are many and varied. A popular mailbox format is 'mbox', which is used by SENDMAIL®. SENDMAIL® is a Mail Transfer Agent, which is a program that moves mail from one machine to another. SENDMAIL® implements a general internet work mail routing facility, featuring aliasing and forwarding, automatic routing to network gateways, and flexible configuration. The 'mbox' mailbox format works by storing all messages together in one single file. All stored messages include the 'from' line of the e-mail message, in order to define where each new message starts. An alternative mailbox technology, particularly for use with QMAIL® is called 'Maildir'. With 'Maildir', the mailbox has a directory and subdirectories. Rather than storing all messages together in one file, a new file is created for each message and all messages are stored separately.

E-mail notification systems allow recipients to define their own notification criteria, content and destination. For example, a recipient could request to be notified only when messages arrive from a certain email address and for the notification to contain only the subject line of the message. The notification could be sent to the recipient's pager, via an e-mail gateway, notifying the recipient that there is mail waiting in the recipient's mailbox.

One example of a Notification System is USA.Net's 'Electronic Message Forwarding System', U.S. Pat. No. 5,937,161. This system works by relaying messages from one address to a second address, based on a recipient's previously defined criteria. Incoming messages are queued while the recipient's previously defined filter criteria are checked. The message is subsequently retrieved from the queue and the filter criteria are applied thereto. If the criteria are satisfied, a notification is then composed and transmitted.

SUMMARY OF THE INVENTION

The present invention seeks to provide on-the-fly message notification.

There is thus provided in accordance with a preferred embodiment of the present invention a message notification system, including:

an on-the-fly message parser which parses data in an incoming message as the message is received and produces on-the-fly parsed information; and an on-the-fly message notification generator, producing a message notification in response to the on-the-fly parsed information, at least partially while the on-the-fly message parser parses the data in the incoming message.

Preferably, the system also includes a connection manager including a socket queue for coordinating operation of the on-the-fly message parser and the on-the-fly message notification generator.

In accordance with a preferred embodiment of the present invention, the system further includes a filter manager cooperating with the on-the-fly message parser and with the on-the-fly message notification generator to determine whether a notification message should be generated, based on the parsed information.

Preferably, the on-the-fly message parser includes a MIME parser.

In accordance with a preferred embodiment of the present invention, the MIME parser is operative to accumulate MIME encoded data until it contains at least a minimum amount of relevant information and then to decode the MIME encoded data on-the-fly.

There is additionally provided in accordance with a preferred embodiment of the present invention a MIME parser including:

an accumulator which accumulates MIME encoded data until it contains at least a minimum amount of relevant information; and an on-the-fly MIME decoder, which decodes the accumulated MIME encoded data on-the-fly.

There is additionally provided in accordance with a preferred embodiment of the present invention a message notification method, including:

on-the-fly parsing of data in an incoming message as the message is received to produce on-the-fly parsed information; and on-the-fly message notification generating, producing a message notification in response to the on-the-fly parsed information, at least partially while the on-the-fly message parsing the data in the incoming message.

Preferably, the method further includes coordinating the on-the-fly message parsing and the on-the-fly message notification generating.

In accordance with a preferred embodiment of the present invention, the method also includes employing the on-thefly message parsing and with the on-the-fly message notification generating to determine whether a notification message should be generated, based on the parsed information.

Preferably, the on-the-fly message parsing includes MIME parsing. The MIME parsing preferably includes accumulating MIME encoded data until at least a minimum amount of relevant information is accumulated and then decoding MIME encoded data on-the-fly.

There is additionally provided in accordance with a preferred embodiment of the present invention a MIME parsing method including:

accumulating MIME encoded data until at least a minimum amount of relevant information is accumulated; and on-the-fly MIME decoding of the accumulated MIME encoded data.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a method and system whereby electronic messages are analyzed and notification messages are forwarded on-the-fly. The present invention advances the art inter alia by obviating queuing of incoming e-mail messages. The present invention preferably employs an e-mail server, which filters on-the-fly as e-mail comes in, and generates an e-mail notification on-the-fly. This is accomplished preferably through analysis of incoming e-mail messages on-the-fly typically by parsing the MIME format messages, and preparation of message notifications while data is still being received. The present invention preferably determines both the destination and content of the notification—if notification is necessary—without first storing the message.

Although the present invention is described with respect to e-mail, it is applicable to electronic messages in general.

Figure 1:
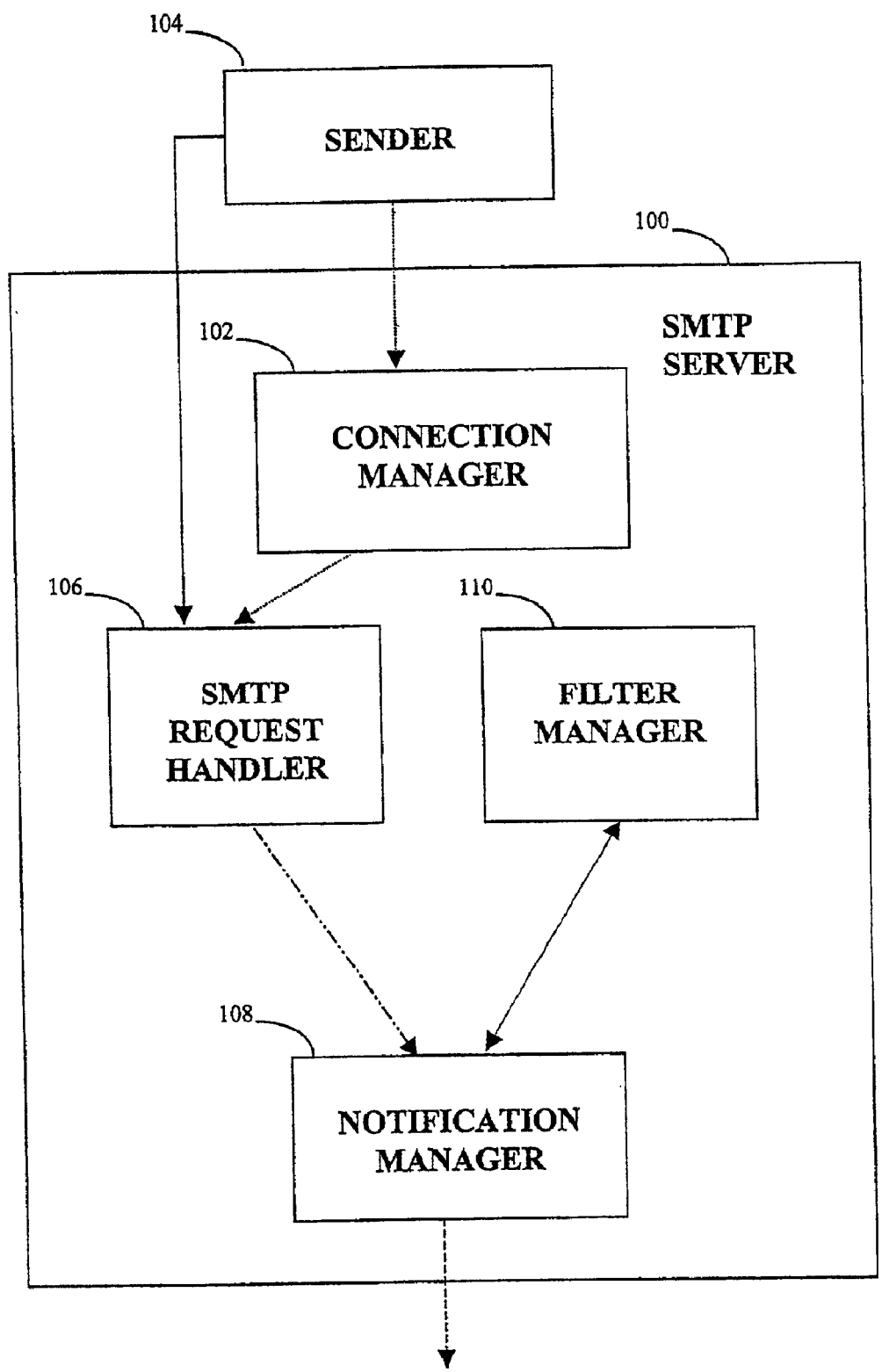
FIG. 1 is a simplified block diagram illustration of a notification system and methodology constructed and operative in accordance with a preferred embodiment of the present invention.

Reference is now made to FIG. 1, which is a simplified illustration of a notification system and methodology of the present invention embodied in an SMTP server 100. A Connection Manager 102 typically receives a connection, preferably in the form of a TCP/IP socket from a sender 104 and preferably directs the connection to an SMTP Request Handler 106. E-mail data then flows directly from sender 104 to the SMTP Request Handler 106. The SMTP Request Handler 106 preferably parses the e-mail data on-the-fly and provides a parsed information output to a Notification Manager 108.

The Notification Manager 108 receives the parsed information output from SMTP Request Handler 106 and preferably interactively interrogates a Filter Manger 110 in order to obtain therefrom pre-selected filter criteria stored therein, which criteria are employed by the Notification Manager 108 to determine whether a message notification is to be transmitted in response to given parsed information.

Figure 2:
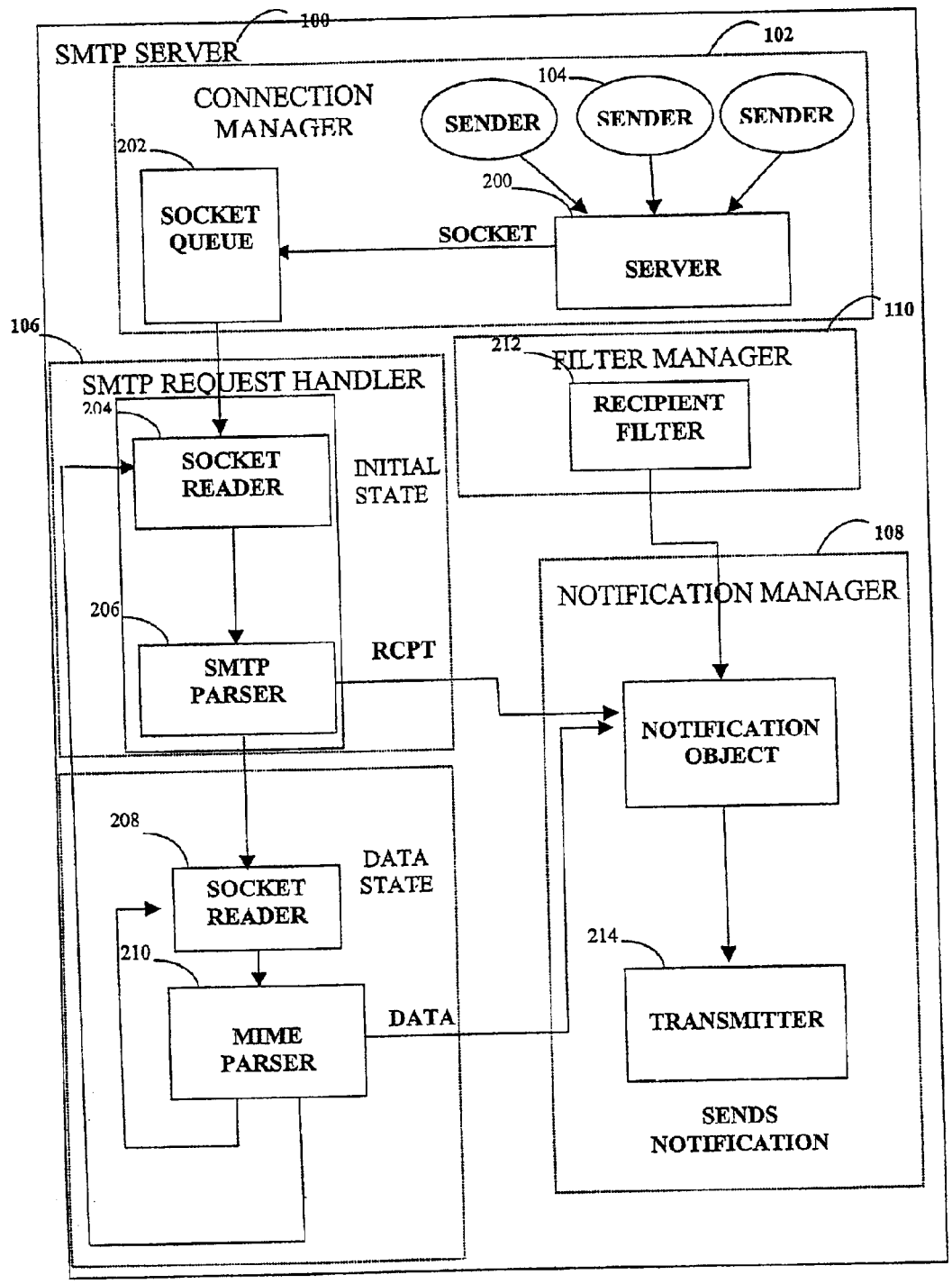
FIG. 2 is a simplified functional block diagram illustrating the structure and operation of the notification system and methodology of FIG. 1 in accordance with a preferred embodiment of the present invention.
Figure 3A:
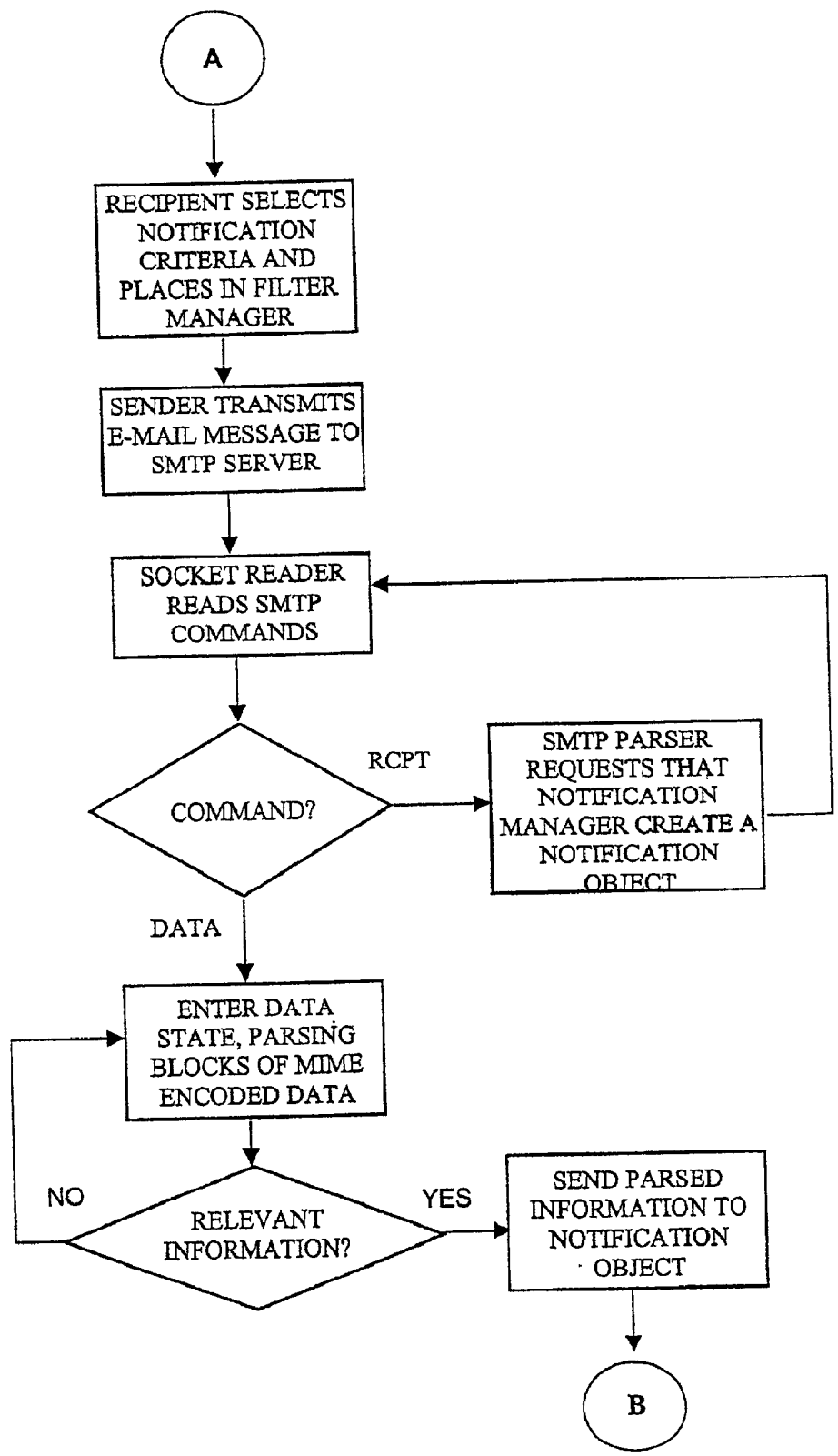
FIG. 3 is a simplified flowchart illustrating operation of the system of FIGS. 1 and 2 in accordance with a preferred embodiment of the present invention.
Figure 3B:
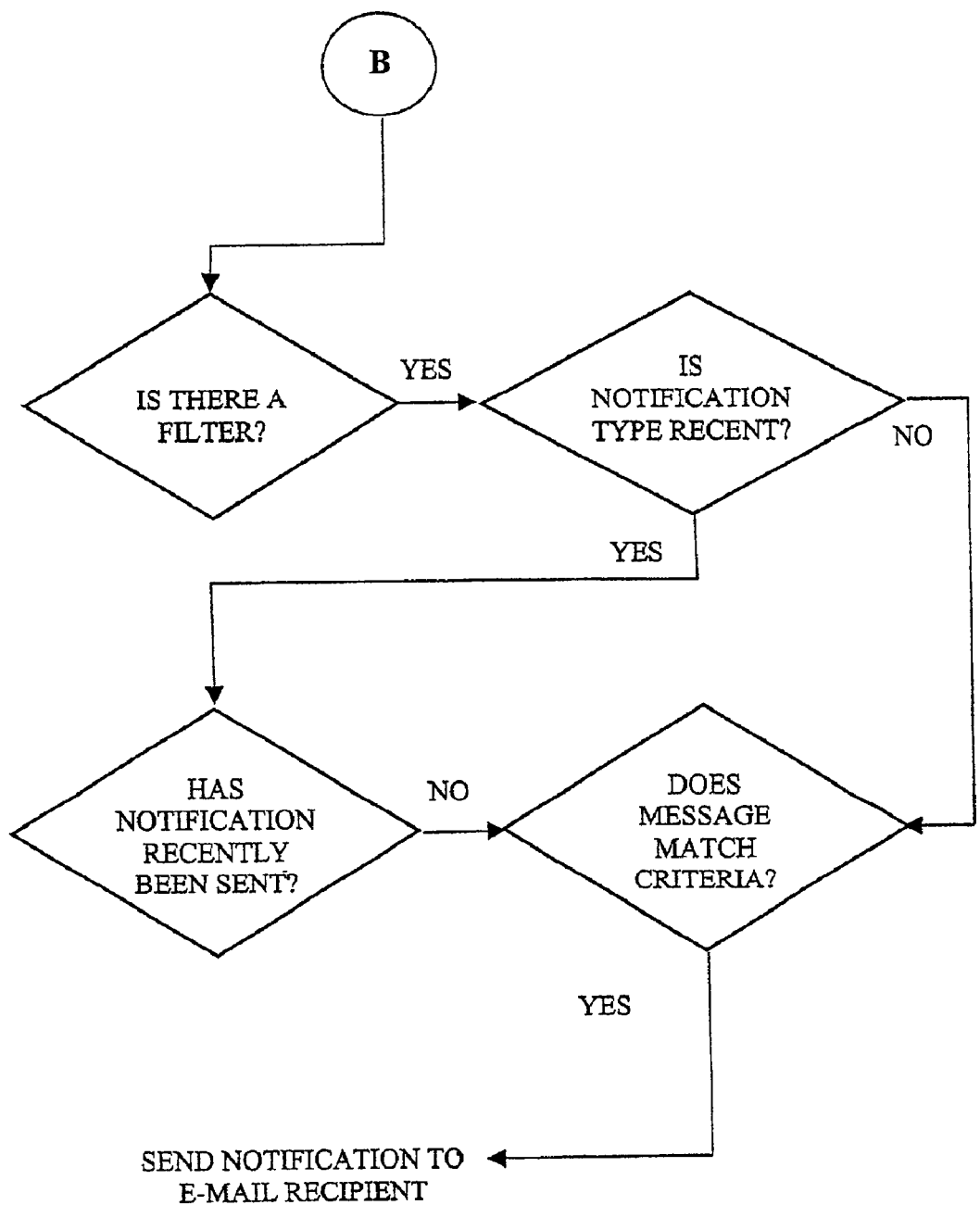

Reference is now made to FIG. 2, which is a simplified functional block diagram illustrating the structure and operation of the notification system and methodology of FIG. 1 and to FIGS. 3A and 3B, which are simplified flowcharts illustrating operation of the system and methodology of FIGS. 1 and 2 in accordance with a preferred embodiment of the present invention.

In a set up phase, prior to receipt of e-mail messages addressed to a recipient, the recipient preferably selects notification criteria, which define filters stored in filter manager 110 (FIG. 1).

Following the set up phase, when e-mail message connections are established, typically by a plurality of different senders, with a connection manager 102 (FIG. 1), a server 200, forming part of the connection manager, provides a socket in respect of each such connection to a socket queue 202, also forming part of the connection manager. The sockets queued in socket queue 202 are dequeued by a socket reader 204 forming part of an SMTP Request Handler 106 (FIG. 1), in response to receipt of a suitable signal from server 200.

Upon dequeuing of a socket, the socket reader 204 begins a process of reading SMTP commands contained in e-mail data received from a sender. The SMTP commands preferably comprise HELO, FROM, RCPT, DATA and QUIT commands.

Socket reader 204 preferably reads blocks of 2048 bytes each through the socket and sends the blocks to a SMTP parser 206, also forming part of SMTP Request Handler 106 (FIG. 1). The SMTP parser 206 parses incoming blocks into the SMTP commands. In a typical SMTP session, where a sender and a recipient, typically embodied in a client and a server, are engaged in conversation, the recipient receives a HELO command from the sender to initiate communication therebetween. This is usually followed by a FROM command, which identifies the sender of the e-mail message, followed typically by a RCPT command, which provides the SMTP server 100 (FIG. 1) with information about the recipient of the e-mail message.

If the SMTP command is a RCPT command, the SMTP parser 206 typically requests that the Notification Manager 108 (FIG. 1) create a NOTIFICATION OBJECT. A NOTIFICATION OBJECT is typically created only when the SMTP parser 206 detects the existence of a valid recipient. The NOTIFICATION OBJECT preferably provides pertinent notification information for transmission inter alia on the basis of notification criteria pre-selected by the recipient and parsed information received on-the-fly from SMTP parser 206.

If the SMTP command is a DATA command, the SMTP Request Handler 106 (FIG. 1) preferably enters a DATA state, in which a socket reader 208 reads bytes through the socket and passes them to a MIME parser 210. The blocks, which are typically MIME encoded, are accumulated by MIME parser 210 until they contain relevant information and then decoded on-the-fly. For example, when receiving a MIME Header such as the subject line, the MIME parser 210 accumulates bytes until an end of DATA CRLF (\r\n) is detected. When the MIME Parser 210 has accumulated and decoded a segment of MIME data on-the-fly, this parsed information is sent to the NOTIFICATION OBJECT.

During parsing, each portion of parsed information supplied by the MIME Parser 210 to the NOTIFICATION OBJECT is preferably filtered on-the-fly by interactive interrogation of a recipient filter 212 stored in the Filter Manager 110 (FIG. 1), which represents the pre-selected filter criteria.

The pre-selected filter criteria may include a recipient selection of one of two notification functionalities: Transmission of a notification for every message or transmission of a single notification for a plurality of recent messages. If the recipient selects 'every message', the recipient will receive a notification for every new incoming message. Should the recipient select a 'recent messages' option, and new messages are received, the recipient will receive only one notification and subsequent electronic messages will not generate further notifications.

For example, pre-selected criteria may include sensing the presence of the word 'urgent' in the subject of the electronic message. Should the analysis find the word 'urgent', the notification message is transmitted.

When the NOTIFICATION OBJECT determines that the filter criteria represented by the recipient filter 212 have been satisfied, the NOTIFICATION OBJECT instructs a transmitter 214 to transmit a message notification.

The MIME parser 210 preferably continues the process of reading data received through the socket until it detects a CRLF PERIOD CRLF flag, which indicates the end of a DATA command.

It will be appreciated by persons skilled in the art that the present invention is not limited by what has been particularly shown and described hereinabove. Rather the present invention includes combinations and sub-combinations of the various features described hereinabove as well as modifications and extensions thereof, which would occur to a person skilled in the art and which do not fall within the prior art.

We claim:

1. A message notification system comprising:
   an on-the-fly message parser which parses data in an incoming electronic mail message as the message is received and produces on-the-fly parsed information, the data being parsed during a message transfer session initiated by an electronic mail message sender coupled to the message notification system; and
   an on-the-fly message notification generator operative to produce a message notification in response to the on-the-fly parsed information at least partially during the message transfer session and while the on-the-fly message parser parses the data in the incoming electronic mail message.

2. The system of claim 1 further comprising a connection manager including a socket queue for coordinating operation of the on-the-fly message parser and the on-the-fly message notification generator.

3. The system of claim 1 further comprising a filter manager cooperating with the on-the-fly message parser and with the on-the-fly message notification generator to determine whether a notification message should be generated, based on the parsed information.

4. The system of claim 1 wherein the on-the-fly message parser comprises a MIME parser.

5. The system of claim 4 wherein the MIME parser is operative to accumulate MIME encoded data until it contains at least a minimum amount of relevant information and then to decode the accumulated MIME encoded data on-the-fly.

6. The system of claim 1, wherein the message transfer session is a Simple Mail Transfer Protocol (SMTP) session.

7. A message notification method, comprising:
   on-the-fly parsing of data in an incoming electronic mail message as the electronic mail message is received to produce on-the-fly parsed information, the data being parsed during a message transfer session initiated by an electronic mail message sender coupled to a message notification system in which the message notification method is performed; and
   on-the-fly message notification generating, producing a message notification in response to the on-the-fly parsed information at least partially during the message transfer session while the on-the-fly parsing of the data in the incoming electronic mail message is performed.

8. The method of claim 7 further comprising coordinating the on-the-fly message parsing and the on-the-fly message notification generating.

9. The method of claim 7 further comprising employing filtering with the on-the-fly message parsing and the on-the-fly message notification generating to determine whether a notification message should be generated, based on the parsed information.

10. The method of claim 7 wherein the on-the-fly message parsing comprises MIME parsing.

11. The method of claim 10 wherein the MIME parsing includes accumulating MIME encoded data until at least a minimum amount of relevant information is accumulated and then decoding the accumulated MIME encoded data on-the-fly.

12. The method of claim 7, wherein the message transfer session is a Simple Mail Transfer Protocol (SMTP) session.

* * * * *